Sept. 24, 1963 E. FRANK 3,105,117
ARRANGEMENT FOR RECEIVING STEREOPHONIC TRANSMISSIONS
Filed Aug. 17, 1960
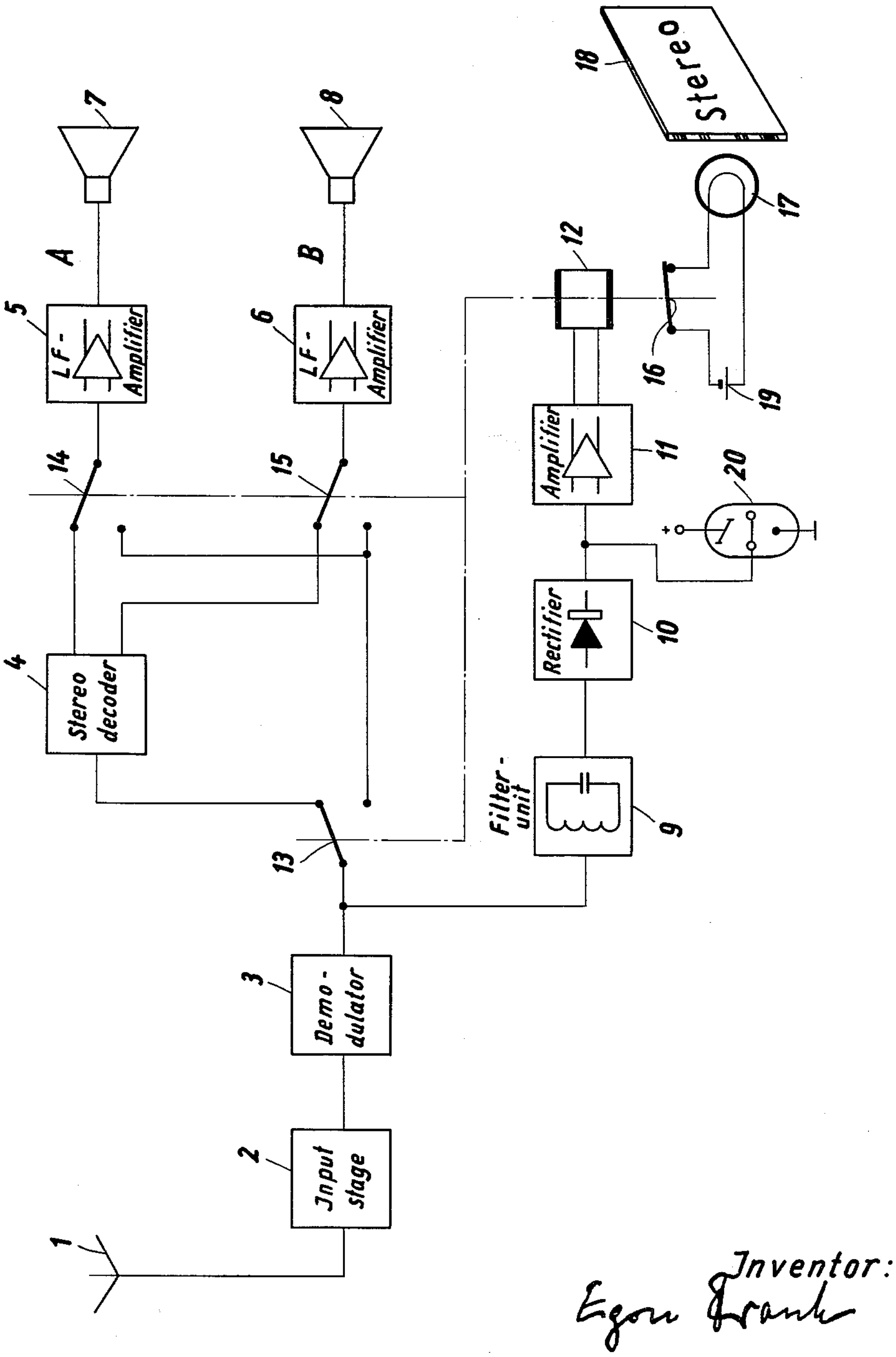
Jnventor:
Egon Frank United States Patent Office
3,105,117
Patented Sept. 24, 1963

3,105,117
ARRANGEMENT FOR RECEIVING STEREOPHONIC TRANSMISSIONS

Egon Frank, Berlin-Mariendorf, Germany, assignor to Loewe Opta Aktiengesellschaft, Berlin-Steglitz, Germany, a company of Germany Filed Aug. 17, 1960, Ser. No. 50,301
3 Claims. (Cl. 179—15)

The invention relates to an arrangement for receiving stereophonic transmissions for systems in which an auxiliary or control carrier is used for transmission purposes. The aim of the invention is to effect a change-over of the high frequency receiving device from monaural to stereophonic operation with such devices in an advantageous manner for, with most sterephonic transmission systems, a change-over is required not only at the transmitting end but also at the stereophonic end.

In order to carry out high frequency stereophonic transmission, most known systems use an auxiliary or control carrier as well as the main carrier to provide the second signal necessary for stereophonic operation or, e.g., with the time multiplex methods, to effect a periodic change-over of the two LF channels. The oscillation here has usually a magnitude of about 30,000 to 70,000 c/s. With such transmission systems, two typical control errors can occur at the receiving end:

(1) With a stereophonic transmission, the receiver can be switched to monaural operation and so only monaural reproduction is possible even if a stereophonic transmission is being sent by the transmitter.

(2) On the other hand, the receiver adjusted for stereophonic operation can be switched to stereophonic operation during reception of a monaural transmission, resulting in more or less heavy distortions or interference noises, according to the system.

The aim of the invention is to avoid such control errors with these types of transmitting methods and at the same time to make it easier to adjust the set by making it unnecessary for the user to perform operations in the set to receive monaural or stereophonic transmissions. He does not need to carry out the switching over to stereophonic reception, e.g. to effect the separation of the two LF channels connected in parallel for monaural operation and to put into operation the stereo-adapter.

According to the invention, the arrangement is constructed so that the switch-over operations from monaural to stereophonic reception, necessary in the receiver, are automatically carried out on tuning to a stereophonic transmitting station in the receiver by means of a control voltage. Accordingly, by means of the arrangement, when tuning into a stereophonic transmitting station, the user does not need to find out whether the receiver is really switched over to stereophonic operation since this switch-over is carried out automatically as soon as the tuning to a stereophonic transmitting station is effected. This, of course, considerably simplifies the adjustment for the user of such receiving devices and the control errors mentioned above cannot arise.

In carrying out the principle of the invention, the arrangement is constructed so that the filtered auxiliary or control carrier releases the automatic switch-over either directly or after additional amplification. This switch-over can be carried out by means of a relay, in particular an electronic relay or a relay tube which is excited by the rectified auxiliary carrier voltage directly or after corresponding amplification in the electronic tube or in a semi-conductor amplifying element.

With such switch-over devices, it is advantageous to use an amplifying stage already present in the receiver for amplifying the control currents fed to the switch-over relay. Thus it makes possible to save amplifying elements and tube stages respectively.

According to a further feature of the invention, an indicator tube fitted e.g. for indicating optically a stereophonic transmission, preferably a magic band or a magic eye, can also be used to amplify at the same time the current of the relay adjustment control. It is then possible to have an optical indication of the type of operation just switched on—monaural or stereophonic—and, at the same time, to avoid using special amplifying stages.

Further, the switch-over relay itself can be used to indicate the type of operation. Accordingly, on the basis of a further feature of the invention, the switch-over relay is provided with a special contact by means of which a special signal lamp is switched on to indicate optically a stereophonic transmission. This signal lamp can also, for example, be used to light up an inscribed sign or some other signal picture on the receiver to show stereophonic transmission by letters, picture or symbol.

An exemplary embodiment of the arrangement in accordance with the invention will now be described by way of the accompanying drawing which shows schematically the circuit arrangement of a receiving set for stereophonic and monaural transmissions in accordance with the invention. In this FIGURE 1 designates the aerial, 2 the receiver input stage including the intermediate frequency amplifier, 3 the demodulator, 4 the stereo-decoder, 5 the low-frequency amplifier for channel A, 6 the low-frequency amplifier for channel B, 7 the loudspeaker for channel A, 8 the loudspeaker for channel B, 9 the filter unit for the auxiliary carrier, 10 the rectifier for the auxiliary carrier, 11 the amplifier stage for amplifying the currents for the afterconnected switch-over relay 12, 13, 14, 15, and 16 the armatures operated by relay 12; 17 the incandescent lamp for illuminating the transparent signal plate, 18 the transparent signal plate, 19 the energy source for heating the lamp 17, and 20 the "magic eye."

If a stereophonic transmission will be performed, the auxiliary or control carrier oscillations are filtered out by filter 9 and activate the relay 12 after rectification and amplification by rectifier 10 and amplifier stage 11. Accordingly the armatures 13, 14, 15, and 16 are operated and have the condition as illustrated in the drawing. The circuit of the lamp 17 is closed by the armature 16 and indicates the stereophonic reception by illuminating the signal plate 18. Furthermore simultaneously the two channels A and B including elements 5, 7 and 6, 8 respectively are connected via armatures 14 and 16 to the stereo-decoder 4 which is supplied with signal energy from the demodulator stage 3 via the armature 13. In case of monaural reception the armatures 13, 14, and 15 are switched over to the other contact (not designated), so that the demodulator stage 3 is directly connected via the armatures 13 to 15 to the channels A and B now lying in parallel. In this condition the armature 16 is disconnected from its contact, and thus the lamp 17 is not in action. Accordingly the signal plate 18 is dark.

What I claim is:

1. Arrangement for receiving monaural and stereophonic transmissions in which an auxiliary carrier is used for stereo transmission purposes comprising a receiver input stage, including the intermediate frequency amplifier, a demodulator stage, a stereo-decoder, two low-frequency amplifier channels afterconnected to said stereo-decoder, two loudspeakers for both said channels respectively, a filter unit arranged behind said demodulator stage for filtering out said auxiliary carrier, a rectifier for said auxiliary carrier afterconnected to said filter unit, an amplifier and a relay, both afterconnected in series to said filter and said rectifier, said relay being excited by said auxiliary carrier filtered out by said filter unit on tuning said input stage to a stereophonic transmitting station and being adapted by means of its contacts to switch-over said two low-frequency channels from parallel connection afterconnected to said demodulator to two separated stereophonic sound channels separately connected to the output of said stereo-decoder which is simultaneously connected in series to said demodulator.

2. An arrangement for receiving monaural and stereophonic transmissions in which an auxiliary carrier is used for stereo transmission purposes comprising a receiver input stage, including the intermediate frequency amplifier, a demodulator stage, a stereo-decoder, two low-frequency amplifier channels afterconnected to said sterodecoder, two loudspeakers for both said channels respectively, a filter unit arranged behind said demodulator stage for filtering out said auxiliary carrier, a rectifier for said auxiliary carrier afterconnected to said filter unit, an amplifier and a relay, both afterconnected in series to said filter and said rectifier, means for optically indicating the reception of a stereophonic transmission, said relay being excited by said auxiliary carrier filtered out by said filter unit on tuning said input stage to a stereophonic transmitting station and being adapted by means of its contacts to switch-over said two low-frequency channels from parallel connection afterconnected to said demodulator to two separated stereophonic sound channels separately connected to the output of said stereo-decoder which is simultaneously connected in series to said demodulator, said means for optically indicating the reception of a stereophonic transmission consisting of a signal lamp which is actuated by means of an additional contact of said relay.

3. Arrangement for receiving monaural and stereophonic transmissions in which an auxiliary carrier is used for stereo transmission purposes comprising a receiver input stage, including an intermediate frequency amplifier, a demodulator stage, a stereo-decoder, two low-frequency amplifier channels afterconnected to said stereo-decoder, two loudspeakers for both said channels respectively, a filter unit arranged behind said demodulator stage for filtering out said auxiliary carrier, a rectifier for said auxiliary carrier afterconnected to said filter unit, an amplifier and a relay, both afterconnected in series to said filter and said rectifier, means for optically indicating the reception of a stereophonic transmission, said relay being excited by said auxiliary carrier filtered out by said filter unit on tuning said input stage to a stereophonic transmitting station and being adapted by means of its contacts to switch-over said two low-frequency channels from parallel connection afterconnected to said demodulator to two separated stereophonic sound channels separately connected to the output of said stereo-decoder which is simultaneously connected in series to said demodulator, said means for optically indicating the reception of stereophonic transmissions consisting of a "magic eye" tube interconnected between said rectifier for the auxiliary carrier and said relay.

References Cited in the file of this patent

UNITED STATES PATENTS

| | | |
|---|---|---|
| 2,007,399 | Koch | July 9, 1935 |
| 2,245,383 | Brokaw | June 10, 1941 |
| 2,330,241 | Roberts | Sept. 28, 1943 |
| 2,511,888 | Weingarten | June 20, 1950 |
| 2,512,530 | O'Brien et al. | June 20, 1950 |
| 2,606,239 | Beste | Aug. 5, 1952 |
| 2,617,923 | Rekart | Nov. 11, 1952 |
| 2,849,529 | Parker | Aug. 26, 1958 |
| 2,910,530 | Clark | Oct. 27, 1959 |

OTHER REFERENCES

Day: "The FM/Multiplex Converter" Audio, August 1958, pp. 19–22 and 97–98.